March 25, 1969  R. J. CAREY ET AL  3,434,170

METHOD OF REINFORCING SHOE PARTS

Filed May 12, 1967

Richard J. Carey
Robert B. Dunlap
INVENTORS

BY *[signature]*

ATTORNEY

United States Patent Office 3,434,170
Patented Mar. 25, 1969

3,434,170
METHOD OF REINFORCING SHOE PARTS
Richard J. Carey, East Milton, and Robert B. Dunlap, Medway, Mass., assignors to Compo Industries, Inc., Waltham, Mass., a corporation of Delaware
Filed May 12, 1967, Ser. No. 638,127
Int. Cl. A43d 13/00
U.S. Cl. 12—146                               8 Claims

ABSTRACT OF THE DISCLOSURE

A method for reinforcing parts of shoe uppers by applying to the area of the upper to be reinforced while the same is held in a uniformly flat plane, a layer of heat-hardenable or moisture-curing elastomer that will remain dimensionally stable at a temperature above the temperature required to effect hardening if the former or that will remain dimensionally stable at the temperature required to effect forming and shaping of the uppers if the latter, and that which will stretch with the uppers during the molding thereof and by the application of heat, will be hardened if the former or that which will stretch with the uppers during the shaping thereof and by the application of moisture-laden air will be hardened if the latter.

---

The present invention relates to shoe manufacture and especially to the stiffening of certain areas of shoe uppers such as the toe box and heel counter areas.

Stiffener elements added to an upper assembly are often bulky, tend to wrinkle and require special handling during assembling operations. Stiffening materials applied to the upper material itself and thereafter activated to effect hardening more often than not, do not stretch sufficiently with the upper material during the forming and shaping operation to remain coextensive with the molded areas when the molding has been consummated and at the temperature of molding tend to become liquid and soak into the upper material, adversely affecting its properties.

The invention has for its objects to provide a shoe part embodying a stiffener which is not subject to the disadvantages referred to above and to provide a method of applying the stiffener to a shoe part.

As herein illustrated, the invention in one aspect resides in a shoe part or assembly of parts having applied to the area or areas to be stiffened a discrete, partially hardened, heat-hardenable or moisture-curable layer of elastomer which is dimensionally stable and is distendable in proportion to the distention of the shoe part as the latter is stretched during molding and shaping operations so that it remains coextensive with the area to which it was applied. The layer is a partially cured elastomer, bonded to the shoe part, and has a nontacky exposed surface. At the temperature of molding or shaping, the layer retains its discreteness.

In accordance with another aspect of the invention, the shoe part is prepared by supporting in a level plane the area thereof to which the stiffener is to be spread, applying a body of fluid elastomer against the exposed surface of the shoe part, partially curing the elastomer to form a discrete homogeneous layer, and then as part of a shoe making operation concomitantly shaping and heating or steaming the shoe part to complete hardening of the stiffener.

The invention will now be described in greater detail with reference to the accompanying drawings wherein.

Figure 1:
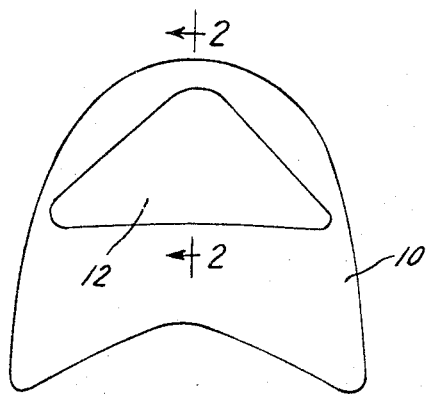
FIG. 1 is a plan view of a shoe part to which a potentially stiffenable material is applied in accordance with this invention.

Referring to the drawings, there is shown in FIG. 1 a shoe part 10, for example the inside of a forepart of an upper in the form of a vamp piece, to which a potentially stiffenable material 12 is applied to an area which is to be stiffened in the finally lasted shoe of which the vamp is a part. The material 12 forms a discrete dimensionally stable, partially hardened, heat-hardenable or moisture-curable layer adhered to the shoe part, with the exposed surface being nontacky.

Figure 8:
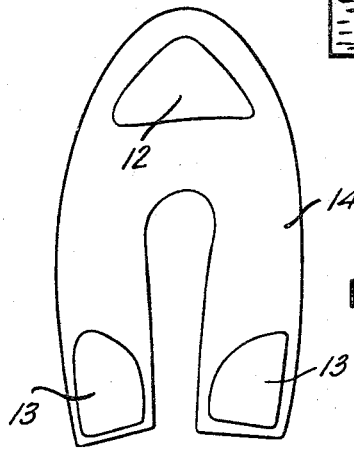
FIG. 8 is a plan view of a one-piece vamp or upper to which a potentially stiffenable material has been applied in the box toe and the counter areas.

In FIG. 8, there is a shoe part 14, for example the inside of a one-piece upper to which a potentially stiffenable material 12 has been applied in the box toe area and a potentially stiffenable material 13 has been applied in the counter areas thereof, that are to be stiffened in the finally lasted shoe of which this upper 14 is a part. The material 13 also forms a discrete dimensionally stable, partially hardened, heat-hardenable or moisture-curable layer adhered to the shoe part, with the exposed surface being nontacky. The material 13 may or may not be the same material 12 as used in the box toe area. The layers 12 and 13 are comprised either of elastomers that are heat-hardenable at molding temperature or are moisture-curable. These layers 12 and 13 suffer no loss of discreteness as layers do not soak into the shoe part and are sufficiently stretchable so as to remain coextensive with the shoe part during stretching of the latter as it is lasted and shaped.

The layers 12 and 13 may be applied, for example, to the shoe part 10 and/or 14 by means of an apparatus as disclosed in the pending application Ser. No. 552,921, filed May 25, 1966, of Evald O. Peterson and Robert B. Dunlap for Apparatus for Applying Stiffening Material to Shoe Parts, now Patent No. 3,393,429, of which one of the coinventors herein was also a coinventer. As shown therein, such an apparatus comprises mold parts 20, 22, see FIG. 3 herein, adapted to support the shoe part 10 in an undeflected flat condition confronting a mold cavity C in the part 20.

Figure 3:
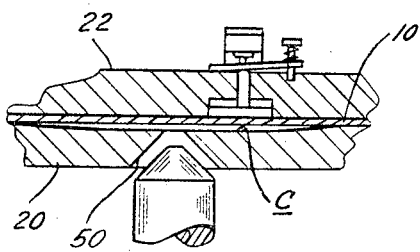
FIG. 3 is a fragmentary section through the mold parts of an apparatus for applying a heat-hardenable stiffener to the shoe part.
Figure 3A:
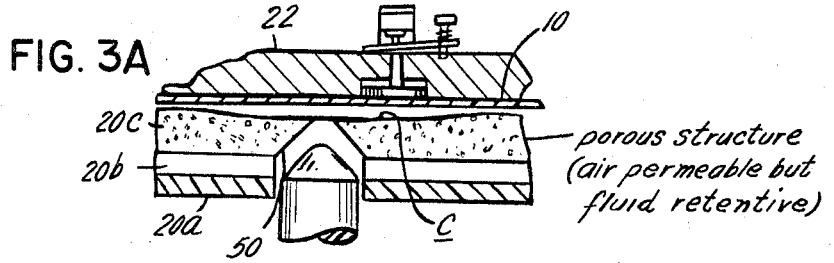
FIG. 3A is a fragmentary section through the mold parts of a modified apparatus for applying a moisture-curable stiffener to the shoe parts.

The apparatus depicted in FIG. 3 is modified as shown in FIG. 3A, for the application of moisture-curable elastomers in lieu of heat-hardenable stiffening materials. Such modification consists in replacing the mold part 20 with a structure consisting of a supporting member 20a incorporating therein, a suitable channel 20b for the admission and passage of moisture-laden air or gas which will flow through a porous part 20c. This porous part 20c may be formed, for example, of a porous metal, including but not restricted to a porous bronze plate made from a compressed powdered metal, or a sintered fritted glass section, or an unglazed porous ceramic plate. The upper surface of the porous part 20c is, of course, shaped in like manner as the upper surface of mold part 20 so as to form the mold cavity C.

Figure 2:
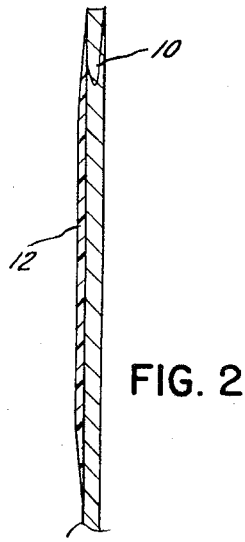
FIG. 2 is an exaggerated section taken on the line 2—2 of FIG. 1.
Figure 4:
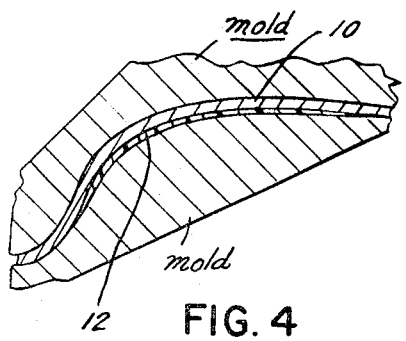
FIG. 4 is a section through a molding apparatus for molding a shoe part to which the stiffener material has been applied.
Figure 5:
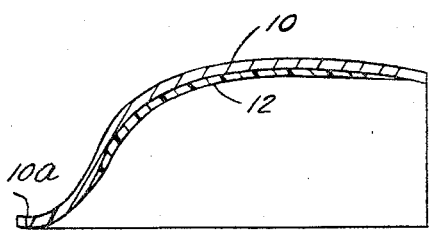
FIG. 5 is a section of the part following molding.

Liquid elastomer is then injected through an opening 50 formed in the part 20 or parts 20a, 20b and 20c into the cavity C to fill the same, and while the elastomer is held in conatct with the surface of the shoe part 10, it is partially cured to be united to the shoe part and to form a discrete, dimensionally stable, partially cured layer 12, as may be best observed in FIG. 2, which is a section taken on line 2—2 of FIG. 1. The applied layer 12 is non-sticky. As a consequence, a plurality of such shoe parts with stiffening layers applied to them may be conveniently stacked, one upon the other without their sticking together. When employed in a shoe making operation the part 10 or 14 may be premolded prior to assembly with other parts of the shoe or may be molded during assembly and manufacture of the shoe. For example, a vamp 10 such as shown in FIG. 1 may be premolded, as shown in FIGS. 4 and 5 with a marginal flange 10a turned outwardly for use in the manufacture of stitch-down shoes. If the vamp is to be incorporated in a shoe employing a conventional lasting operation, the stiffener may be exposed to heat and/or moisture just before the upper is pulled over and lasted onto the last or it may be exposed to heat and/or moisture during or following the lasting operation. When the stiffener is applied to the counter portion of an upper, the latter may be premolded to form the back part of the shoe as is provided for by back part molding machines available for this purpose, or may be molded in shape on the last during or following lasting of the upper thereto.

The stiffening layers 12 and 13 may be formed of either an elastomeric compound cured by atmospheric moisture or steam or of a heat hardenable elastomer.

Such a moisture curable elastomeric compound may be comprised of moisture-cure type polyurethane elastomeric compounds such as, polyoldiisocyanate adducts that cure through the reactions of terminal isocyanate groups with atmospheric moisture.

For example the reaction product of one mole of a polyol of 1000 molecular weight with two moles of tolylenediisocyanate will be a moisture curable polyurethane. A typical formulation of moisture-cured prepolaymer resin system would consist of:

| | Moles |
|---|---|
| Polypropylene glycol (1000 molecular wt.) | 1 |
| 1,3-butylene glycol | 1 |
| Trimethylolpropane | 2 |
| Tolylenediisocyanate (80% 2,4-isomer/20% 2,6-isomer) | 8 |

The reaction of the isocyanate terminal groups should proceed slowly enough during the first stages of the reaction sequence to allow diffusion from the llm of the elastomeric product, of the carbon dioxide formed in the reaction.

Final properties of the elastomeric llm can be varied through the selection of the polyol. The low molecular weight and high functional polyols produce harder coatings, whereas high molecular weight polyethers give soft elastomeric coatings.

Other moisture curable elastomeric polymers may be employed such as the moisture-cure type silicones, as for example—the acetoxy end-blocked dimethyl polysiloxanes.

The stiffening layers may also be formed of heat hardenable elastomers. An example would be a heat hardenable one component polyurethane material such as the reaction product of one mole weight of a polyol of 1000 molecular weight plus two mole weights of tolylenediisocyanate buffered with 2.1 mole equivalents of phenol to block the terminal isocyanate groups. Upon heating at 160° centigrade, the terminal isocyanate groups are regenerated and can react with polyol hydroxyl groups in the presence of heat to form stable "heat cured" linkages.

A typical formulation of a heat hardenable resin system would consist of—

| | Moles |
|---|---|
| Polypropylene glycol (1000 molecular wt.) | 1 |
| Tolylenediisocyanate (80% 2,4-isomer/20% 2,6-isomer) | 2 |
| Phenol | 2.1 |

Heat 8 hours at 75 to 80° C. in presence of diethylcyclohexamine catalyst.

Other examples of heat hardenable one component urethane systems would be mixtures of polyol and aldehyderesin blocked polyisocyanates that regenerate the terminal polyisocyanate groups when exposed to temperatures above 212° F.

Other heat hardenable elastomeric materials that may be employed in the stiffening layers 12 and 13 may be heat vulcanizable silicones such as those based on dimethyl polysiloxane, polyvinyl chloride "plastisols," dispersions of discrete particles of high molecular weight polymers of polyvinyl chloride or copolymers in which vinyl chloride is the predominant constituent in liquid monomeric plasticizer systems. Solid gelation of the plastisol takes place where the temperature of the plastisol deposit is raised to the point where the dispersant plasicizer system becomes an active solvent for the resin particles. The resin particles in the solid gel state are fused together by high temperatures—usually 300 to 400° F.—into an integral, elastomeric film that imparts stiffening properties to shoe parts.

Other head hardenable materials may be based on polyacrylic materials particularly those acrylic resins characterized as being vinyl addition polymers having pendant chemical groups capable of further reactions. These groups may be amide carboxyl, hydroxyl and epoxy in function.

Other materials that may be used are based on heat vulcanizable or heat cured compounds of depolymerized, liquid natural and synthetic rubbers.

The method of applying a heat-hardenable elastomer to the shoe part has already been described with reference to FIGS. 3, 4 and 5. The method of applying a moisture-curable elastomeric compound may be best described with reference to FIGS. 3a, 6 and 7. After the shoe part 10 has been inserted in the modified apparatus shown in FIG. 3a, one of the above enumerated moisture-curable elastomeric compounds is then injected through the opening 50 formed in parts 20a, 20b and 20c, into the cavity C so as to fill the same. Thereafter, moisture-laden air or gas is admitted, for a short period of time of the order of about ten to thirty seconds, through the channel 20b so as to pass through the porous structure 20c and enter the underside of the cavity C.

Figure 6:
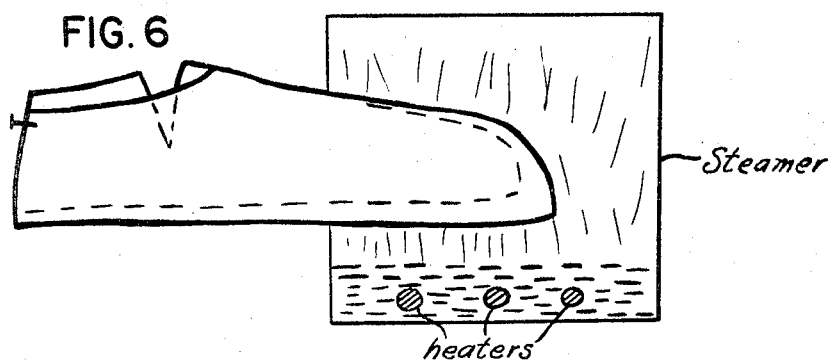
FIG. 6 is a side elevational view of an upper assembled on a last, the forepart of which is being exposed to steam or warm moisture-saturated air in a suitable box toe steamer.
Figure 7:
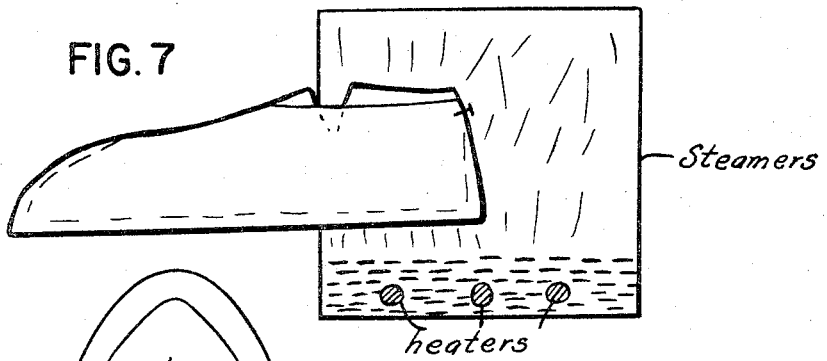
FIG. 7 is a view similar to that shown in FIG. 6, but with the backpart thereof being exposed to steam or warm moisture-saturated air.

Upon entering, the moisture-laden air or gas will act upon the injected material so as to form a partially hardened skin thereabout and closing the remainder of the material in an envelope. The shoe part 10 with the applied layer 12 may now be removed and stored for subsequent use or may be immediately subjected to a shaping operation, as may be most convenient. The shaping operation is preferably carried out after a preconditioning step in which the upper, with the stiffening layer, is exposed to steam or warm, moisture-saturated air. Such exposure may be carried out, for example, as shown in FIGS. 6 and 7 wherein an upper assembled on a last is shown inserted into a steaming device, such as a conventional box-toe steamer, for a period sufficient to impregnate the upper and to initiate the core of the applied stiffening layer. Immediately thereafter, the shaping and molding operations may be carried out in well known manner and using well known apparatus.

The stiffening layers 12 and 13 may have a central thickness from about 0.001" to about 0.040", and are preferably of the order of 0.004–0.005". It should also be noted from FIGS. 3 and 3a that the cavity C is tapering toward the sides. As a result, the applied stiffening layer 12 will be formed with a taper that diminishes toward the marginal edge. This taper serves as a skived edge eliminating the need for such a skiving operation which has heretofore been required with conventional box toe materials.

One feature of the invention is that the stiffening layers 12 and 13 retain their identity as discrete dimensionally stable layers bonded to the surfaces of the shoe parts which are to be stiffened without impregnation of the latter. Another feature is that these layers 12 and 13 are susceptible of individually molding together with the upper at temperatures below their melting point to effect complete hardening. A further feature is that these layers 12 and 13 are stretchable together with the upper without separating therefrom as the latter is molded and shaped.

It should be understood that the present disclosure is for the purpose of illustration only and that this invention includes all modifications and equivalents which fall within the scope of the appended claims.

What is claimed is:

1. The method of reinforcing parts of shoe uppers comprising applying to the area of the upper to be reinforced while flat a discrete layer of heat-hardenable elastomer which remains stable at a temperature above that required to effect hardening and which distends equally with the upper during molding, and subjecting the upper to molding at a temperature to effect hardening.

2. The method of reinforcing parts of shoe uppers comprising applying to the part a discrete layer of potentially hardenable moisture-curing elastomer of the kind which will remain stable at the temperature required to effect forming and shaping of the uppers, and will stretch with the upper material during shaping so that it remains coextensive with the area to which it is applied at the conclusion of the shaping operation, and then, preparatory to a shoe making operation, shaping the part, with the application of hot moisture-laden air.

3. The method of reinforcing parts of shoes comprising supporting a shoe part with an area to which the stiffener is to be applied in a uniformally flat plane, holding a liquid body of heat-hardenable elastomer against an unsupported side, while holding the layer, heating it to effect transformation to a partially solid state which adheres to the part and has a nontacky exterior surface, and then, as part of a shoe making operation, concomitantly shaping and heating the part to effect complete hardening of the layer.

4. A shoe part embodying a potentially hardenable stiffener adapted when completely hardened to retain the shoe part in the shape imparted thereto at the time of molding and complete hardening; characterized in that the stiffener is a discrete stable layer of elastomer bonded to the area to be shaped, which layer retains its discreteness at the temperature of shaping and hardening and distends in proportion to the distention of the part during shaping without separation from the shoe part.

5. A shoe part according to claim 4, wherein the stiffener layer is bonded directly to the inside surface of the shoe part and is coextensive with the area to be shaped prior to and after shaping.

6. A shoe part according to claim 4, wherein the stiffening layer is in the order of from about 0.001 inch to about 0.040 inch thick.

7. A shoe part according to claim 4, wherein the stiffening layer is a heat-hardenable elastomer.

8. A shoe part according to claim 4, wherein the stiffening layer is a moisture-cured elastomer compound.

References Cited

UNITED STATES PATENTS

| | | | |
|---|---|---|---|
| 2,958,880 | 11/1960 | Morse | 12—146 |
| 3,026,573 | 3/1962 | Ciaio | 12—146 X |
| 3,316,573 | 5/1967 | Chaplick et al. | 12—146 |

PATRICK D. LAWSON, *Primary Examiner.*